United States Patent [19]

Fedotkin et al.

[11] 4,027,045
[45] May 31, 1977

[54] PROCESS FOR PREPARING OXYGENATED COCKTAIL

[76] Inventors: Igor Mikhailovich Fedotkin, ulitsa Stepana Khalturina, 19, kv. 9; Anatoly Konstantinovich Jukhimets, ulitsa Kosmicheskaya, 5, kv. 82; Leonid Panteleimonovich Odery, prospekt Voroshilova, 9, kv. 201, all of Kiev, U.S.S.R.

[22] Filed: Feb. 3, 1975

[21] Appl. No.: 546,982

[52] U.S. Cl. .................. 426/312; 261/DIG. 26; 426/474; 426/590
[51] Int. Cl.² .......................................... C02D 1/02
[58] Field of Search .......... 426/312, 320, 477, 474, 426/569, 590, 591, 599, 592, 593; 424/43; 261/DIG. 26

[56] References Cited
UNITED STATES PATENTS

| 272,585 | 2/1883 | Roussan et al. | 426/590 |
| 1,725,956 | 8/1929 | Cleveland | 426/590 X |
| 2,038,451 | 4/1936 | Schattaneck | 426/474 X |
| 2,072,691 | 3/1937 | Stark | 426/474 |
| 3,698,913 | 10/1972 | Malinin | 426/474 X |
| 3,728,128 | 4/1973 | Luksas | 426/474 X |
| 3,787,590 | 1/1974 | Borders et al. | 426/312 |

FOREIGN PATENTS OR APPLICATIONS 29,552 12/1906 United Kingdom ............... 426/477

Primary Examiner—S. Leon Bashore
Assistant Examiner—Kenneth M. Schor

[57] ABSTRACT

According to the proposed process for preparing oxygenated cocktail, dispersed oxygen is continuously introduced into a continuously supplied thin (not in excess of 5 mm) layer of a foam-forming food liquid over the entire volume of said liquid. The disclosed apparatus for effecting said process comprises a vessel with a porous member arranged therein, which divides said vessel into two sealed off portions. The lower portion permanently communicates via a branch pipe with a forced oxygen supply source, whereas the upper portion serves as a container for the foam-forming liquid for preparing oxygenated cocktail and has a pipe for the supply of said food foam-forming liquid and a pipe for discharging prepared cocktail. The foam-forming food liquid may be fruit juice, kvass, beer, whey, buttermilk, herb infusion and other biologically adequate liquid products.

1 Claim, 2 Drawing Figures

PROCESS FOR PREPARING OXYGENATED COCKTAIL

The present invention relates to the production of food-stuffs which help to normalize all the functions of the human organism and eliminate oxygen lack effects. More particularly, the invention relates to a process for preparing oxygenated cocktail and an apparatus for carrying out that process.

The proposed method and apparatus are especially advantageous in the medical and food industries.

Oxagenated cocktail prepared by using the process disclosed herein is employed to prevent oxygen lack caused by different diseases and combat ageing.

Many diseases reduce the oxygen content in the blood and cut down the consumption of oxygen and assimilation thereof by tissues, which leads to oxygen deficiency known as hypoxia.

These phenomena are remedied by resorting to oxygen therapy, or, more specifically, oxygen inhalation, which helps to eliminate the effects of oxygen lack, normalize the functions of the human organism and raise its resisting power to disease.

That notwithstanding, the introduction of oxygen through the respiratory tract is not necessarily the best form of oxygen therapy. In a number of cases oxygen has to be introduced through the gastrointestinal tract.

The most effective form of enteral oxygen therapy is to consume different oxygenated beverages which are oxygen-foam structures based on biologically adequate products, wherein a liquid film envelops tiny oxygen bulbs and forms foam which is referred to as an oxygenated cocktail.

The indications for enteral oxygen therapy include, among others, peptic ulcer, chronic gastritis and colitis, liver diseases, hypertension, and atherosclerosis.

There is known a process for preparing oxygenated cocktail, whereby dispersed oxygen is introduced under pressure into a thick layer of a foam-forming food liquid contained in a vessel. As this takes place, oxygen bubbles that penetrate into the foam-forming food liquid are enveloped by a thin layer of that liquid and thus form foam which is concentrated in the upper layers of the liquid without penetrating into the deeper layers. The foam thus formed is removed from the vessel.

The foregoing process is carried out with the aid of an apparatus comprising a vessel with a porous member arranged therein. Oxygen is supplied under pressure to said vessel through a pipe. The porous member is intended to disperse oxygen into the foam-forming liquid that fills the vessel. The vessel is made up of two detachable disks having end-face recesses which form chambers communicating with an oxygen supply source. Arranged between said disks are porous plates made of filter paper.

In this process oxygen must penetrate into a stationary foamforming liquid column, which can only be effected by directing oxygen into said liquid under a high pressure. This accounts for an increased oxygen consumption and calls for additional safety measures.

In addition, foam is only formed in the upper layers of the foam-forming liquid. As a result, the foam bubbles have different sizes. As the foam layer grows in thickness, the bubbles expand and burst, which, turn, leads to oxygen losses. The cocktail prepared in this manner has a non-uniform, coarsely dispersed structure which is marked by a low degree of oxygen saturation and a low oxygen content.

All the foregoing features of the known process account for a low foam formation rate.

The known process is confined to a limited volume of food foam-forming liquid poured into the vessel prior to the introduction of dispersed oxygen; hence, this process is not continuous.

The foregoing embodiment of the porous member in the known apparatus makes it possible to supply dispersed oxygen to the stationary layer of the foam-forming food liquid only through the end faces of the porous member and largely over the peripheral portion of the liquid mass. This accounts for a non-uniform distribution of oxygen bubbles over the volume of the foam-forming food liquid and for the formation of a stagnant zone in the central portion of the liquid mass, where no foaming takes place.

The combination of the above factors produces a cocktail having a coarsely dispered structure and marked by a low oxygen saturation and low foaming rate.

In view of the low oxygen saturation, a patient has to consume great quantities of the cocktail and, consequently, great quantities of liquid, which is often contraindicated.

The cocktail prepared in the foregoing manner has to be consumed by a patient from the same vessel in which it has been prepared, which does not comply with the sanitary and hygienic requirements imposed upon the apparatus intended for the mass production of such cocktail.

The use of filter paper for oxygen dispersion, which paper has to be changed after each working cycle, which, in turn, requires to dismantle and again assembly the porous member, complicates the servicing of the apparatus.

The known apparatus also necessitates dosing the liquid in the vessel prior to introducing dispersed oxygen into that liquid, which makes it impossible to produce the cocktail in a continuous process.

It is an object of the present invention to provide a process which would ensure intense foaming of the food foam-forming liquid and make it possible to continuously produce oxygenated cocktail having a high degree of oxygen saturation.

It is another object of this invention to provide an apparatus which would intensify the foaming of the foam-forming liquid, as compared to the known apparatus.

It is still another object of the present invention to provide an apparatus which would be more compact and simpler to service than the known apparatus.

It is yet another object of the present invention to provide an apparatus on a higher sanitary and hydienic level, as compared to the known apparatus, under the conditions of mass oxygenated cocktail production.

It is still a further object of the invention to provide an apparatus that would ensure a more economical oxygen consumption than the conventional apparatus.

Fhe foregoing and other objects of the invention are attained by providing a process for preparing oxygenated cocktail, whereby dispersed oxygen is introduced into foam-forming food liquid, said foam-forming food liquid being supplied, in accordance with the invention, continuously and in a layer less than five millimeters thick, dispersed oxygen being also supplied continuously and over the entire volume of the liquid.

The proposed process is carried out with the aid of an apparatus for preparing oxygenated cocktail, comprising a vessel, wherein a porous member for the dispersion of oxygen supplied under pressure through a pipe is so arranged, in accordance with the invention, that said porous member divides said vessel into two portions isolated from each other, the lower portion being in permanent communication with a forced oxygen supply source, whereas the upper portion serves to contain the foam-forming food liquid and prepare the cocktail and has a pipe for the supply of said liquid to the vessel, the outlet end of said pipe located at a distance of less than five millimeters from the surface of the porous member, the prepared cocktail being discharged through a pipe installed in the upper portion of the vessel.

In accordance with the invention, the porous member may be made from a two-layer porous material with a porosity of 50 percent, the pores of the lower layer being up 50 mu in size, whereas those of the upper layer are about 10 mu in size.

It is expedient that the porous material be a metal which is neutral with respect to the cocktail components.

According to the invention, the porous material may also be a plastic which is neutral with respect to the cocktail components.

It is expedient that the vessel of the proposed apparatus be made detachable in the zone where the porous member is arranged.

According to the invention, the pipe for the supply of foam-forming food liquid and the pipe for the supply of oxygen may be arranged coaxially.

It is expedient that the pipe for the discharge of cocktail have a somewhat greater diameter than the pipe for the supply of foam-forming food liquid to the vessel.

According to the proposed process, foam-forming food liquid is supplied continuously in the form of a thin layer whose thickness is not in excess of 5 millimeters, disperesed oxygen being continuously introduced over the entire volume of said layer. This ensures intense and uniform foaming over the entire volume of the thin liquid layer and rules out the formation of stgnant zones in said layer.

Continuous and simultaneous supply of oxygen and foam-forming food liquid ensures, in turn, continuous cocktail production.

With the foam-forming food liquid supplied in the form of a thin layer of no more than five millimeters in thickness, oxygen is supplied at a minimum working pressure of 0.2 kgf/cm$^2$.

This ensures a more economical oxygen consumption, as compared to the conventional process, and rules out the danger of an explosion in the course of cocktail preparation.

The formation of foam over the entire volume of the thin layer of foam-forming liquid accounts for the formation in that liquid of fine oxygen bubbles coated with a thin film of the foam-forming liquid, which bubbles are not easily destructible and retain their shape as the foam moves upward in the vessel.

This makes it possible to produce a cocktail with a high degree of foam dispersion, an increased oxygen content and reduced oxygen losses, as compared to the conventional process.

Continuous supply of foam-forming food liquid makes the thin layer of that liquid movable. Thus, a thin layer of the liquid, which is instantaneously foamed by continuously supplied dispersed oxygen, is raised in the newly arrived liquid layer. This accounts for a continuous rise of the foam without noticeably affecting its structure.

Intense foaming over the entire thin liquid layer makes it possible to prepare a cocktail with a high oxygen content in a minimum amount of liquid.

The fact that the porous member is arranged in the proposed apparatus so that is has the shape of the cross-section of the vessel and divides said vessel into two portions isolated from each other ensures a directional uniform introduction of dispersed oxygen over the entire volume of the thin layer of foam-forming food liquid and intense foaming of that liquid.

The presence in the apparatus fo this invention of the pipe for the supply of foam-forming food liquid ensures a directional supply of the liquid to the surface of the porous member. The spacing of the outlet end of said pipe at a distance of less than 5 millimeters from the surface of the porous member makes it possible to continuously maintain a preselected height of the foam-forming food liquid layer and prevent destruction of the foam structure, which accounts for a high oxygen content in the foam. The foam structure remains intact due to the fact that the liquid is applied through the pipe directly to the surface of the porous member, under the layer of foam.

According to the invention, the prepared cocktail is discharged through a pipe installed at the upper portion of the vessel, the diameter of said pipe being somewhat greater than that of the pipe for the supply of liquid to the vessel, which ensures minimum damage to the foam structure as the cocktail is being discharged from the vessel and makes it possible to comply with the sanitary and hygienic requirements imposed upon the mass oxygenated cocktail production.

The fact that the porous member is made, in accordance with the invention, of a two-layer porous material having a porosity of up to 50 percent, with the pore size of the lower layer being up to 50 mu, whereas that of the upper layer is about 10 mu, accounts for a high degree of oxygen dispersion and uniform distribution of oxygen over the entire surface of the porous member; it also rules out the penetration of the liquid through the porous member into the lower portion of the vessel.

The fact that the porous member is made, in accordance with the invention, of a metal or plastic that are neutral with respect to the cocktail components, simplifies the design and maintenance of the porous member.

According to the invention, the vessel is made detachable in the zone where the porous member is arranged. This provides for a quick replacement of the porous member, if necessary, and facilitates preventive inspection of the porous member.

The coaxial arrangement in accordance with the invention, of the pipe for the supply of foam-forming liquid and the pipe for the supply of oxygen ensures uniform distribution of the liquid over the surface of the porous member and intense foaming of the liquid.

Other objects and advantages of the present invention will become more apparent from the following detailed description of preferred embodiments thereof to be read in conjunction with the accompanying drawings, wherein.

Figures 1, 2:
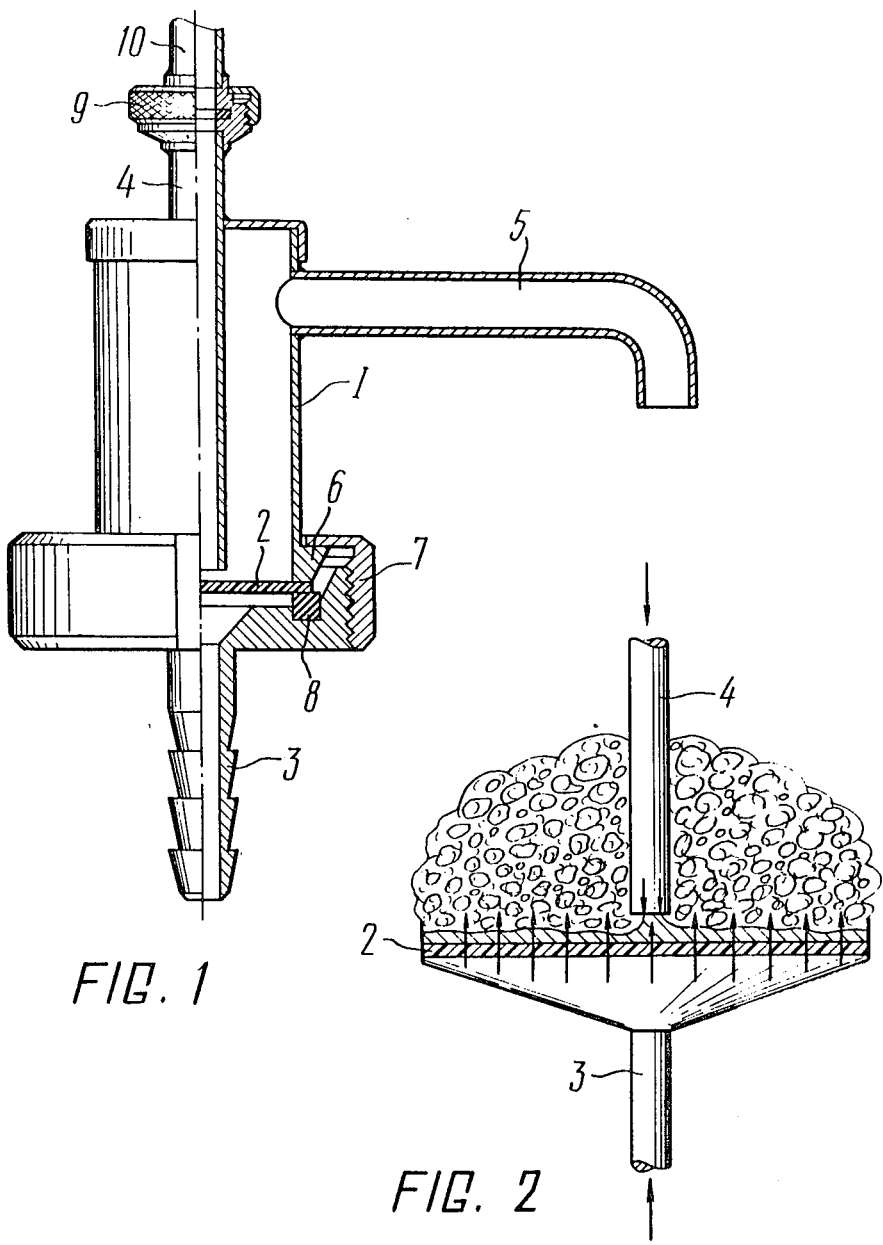
FIG. 1 is a general, partially cut-away view of an apparatus for preparing oxygenated cocktail in accordance with the invention.
FIG. 2 shows the way oxygenated cocktail is prepared in accordance with the invention.

Referring now to the attached drawings, the proposed apparatus for preparing oxygenated cocktail comprises a cylindrical vessel 1. (FIG. 1), arranged wherein is a porous member 2 for oxygen dispersion. The porous member 2 is so arranged in the vessel 1 that is divides it into two portions isolated from each other, the lower portion being connected by means of a branch pipe 3 with an oxygen source (not shown), whereas the upper portion serves to contain foam-forming liquid and prepare the cocktail.

Such an arrangement of the porous member 2 in the vessel 1 ensures directional and uniform distribution of dispersed oxygen through said porous member over the entire volume of the thin layer of the foam-forming food liquid and intense foaming of that liquid. the vessel 1 is detachable in the zone where the porous member 2 is arranged.

The fact that the vessel 1 is made up of two detachable portions makes it possible to clean said vessel to to prevent it being clogged and replace if necessary, the porous member 2.

The porous member 2 has the shape of the cross-section of the vessel 1 and is made from a two-layer porous material having a porosity of up to 50 percent. The pore size of the lower layer of the porous member is up to 50 mu, whereas that of the upper layer is about 10 mu. The structure of the porous member makes it possible to regulate the rate of oxygen dispersion.

The two-layer porous material may be a metal, for example, titanium, or a plastic, for example, fluoroplastic. All the porous member materials must be neutral with respect to the cocktail components.

The fact that the porous member is made of a two-layer porous material provides for a high degree of oxygen dispersion and uniform distribution of oxygen over the entire surface of the porous member; it also rules out the penetration of the liquid into the lower portion of the vessel and, consequently, into the oxygen source.

The fact that the porous member is made from a metal or plastic simplifies the design of the porous member and makes unnecessary systematic regeneration thereof in the course of prolonged operation.

Installed at the upper portion of the vessel 1 is a pipe 4 for the supply of foam-forming liquid to the vessel 1, the outlet end of said pipe being spaced at a distance of less than 5 millimeters from the surface of the porous member 2.

The distance between the outlet end of said pipe 4 and the surface of the porous member 2 is adjusted, depending upon the viscosity of the foam-forming liquid; as the viscosity increases, so does the distance between the outlet end of the pipe 4 and the surface of the porous member 2. Installed at the upper part of the upper portion of the vessel 1 is a pipe 5 for discharging the cocktail, the diameter of said pipe 5 being somewhat greater than that of the pipe 4 for the supply of foam-forming liquid to the vessel 1.

The presence in the proposed apparatus of the pipe 4 for the supply of foam-forming food liquid ensures a directional supply of the liquid to the surface of the porous member 2. The fact that the outlet end of said pipe 4 is spaced at a distance of less than five millimeters from the surface of the porous member 2 makes it possible to maintain a constant thickness of the foam-forming liquid layer with due regard for the liquid's viscosity; it also makes it possible to preserve the structure of the foam and thus raise the oxygen content therein.

The pipe 5 installed at the upper part of the vessel 1, whose diameter is somewhat greater than that of the pipe 4, ensures removal of prepared cocktail with a minimum damage being done to its structure; it also makes it possible to meet the sanitary and hygienic requirements imposed upon the mass production of oxygenated cocktail.

At the bottom of the upper portion of the vessel 1 there is an annular protrusion 6 for a coupling nut 7 to connect the upper and lower portions of the vessel 1, the porous member 2 being arranged between these portions. Between the porous member 2 and lower portion of the vessel 1 there is an annular rubber packing 8 to seal off the lower portion of the vessel 1.

The pipe 4 for the supply of foam-forming food liquid and the pipe 3 for the supply of oxygen are disposed coaxially, which ensures uniform distribution of the liquid layer over the surface of the porous member 2 and intense foaming of the liquid.

The pipe 4 for the supply of foam-forming food liquid communicates by means of a detachable threaded coupling 9 with a liquid supply main 10.

The proposed process for preparing oxygenated cocktail with the aid of the proposed apparatus is effected as follows.

From the main 10 foam-forming food liquid is aupplied to the upper portion of the vessel 1 (FIG. 1) through the pipe 4 whose outlet end is spaced at a distance of less than five millimeters from the surface of the porous member 2.

The foam-forming food liquid may be fruit juice, kvass, beer, whey, buttermilk, herb infusion and other biologically adquate liquid products.

The liquid spreads over the surface of the porous member 2 (FIG. 2) and forms a layer whose thickness is not in excess of five millimeters. The foam-forming food liquid is supplied continuously.

The continuous supply of the foam-forming food liquid is accompained by the continuous supply of oxygen from the oxygen source via the branch pipe 3, oxygen being supplied to the lower portion of the vessel 1, under the porous member 2, at a minimum working pressure of 0.2 kgf/cm$^2$. Only medically pure oxygen is used for the preparation of oxygenated cocktail, which contains 99 percent of oxygen and 1 percent of nitrogen and is free from any gaseous admixtures.

While passing through the porous member 2, oxygen is finely dispersed and uniformly distributed over the surface of the porous member 2, upon which it is introduced into the thin layer of the foam-forming food liquid.

While passing through the thin layer of the foam-forming food liquid, oxygen instantaneously foams up that liquid. The foaming is accompanied by continued supply of foam-forming liquid to the surface of the porous member 2, which liquid is uniformly spread over the surface of the porous member 2 and is again foamed by oxygen continuously supplied through the porous member 2, lifting the previously formed foam layer, without breaking it.

The foam dispersion depends upon the foaming capacity of the starting liquid material and is regulated by adjusting the oxygen and liquid supply, as well as by varying the porous member material.

The continuous supply of oxygen into the thin layer of the continuously supplied liquid ensures intense and uniform foam formation over the entire volume of the thin liquid layer and continuous cocktail preparation.

The formation of foam over the entire volume of the foam-forming liquid make it possible to prepare cocktail with a high degree of dispersion and high oxygen content. When the foam reaches the level of the pipe 5 (FIG. 1) for removal of prepared cocktail installed at the upper portion of the vessel 1, cocktail is discharged through said pipe 5 from said vessel 1. Due to the fact that the diameter of the pipe 5 is somewhat greater than that of the liquid supply pipe 4, the foam structure remains intact, as the cocktail is being removed from the vessel 1.

Listed hereinbelow are comparative oxygen content data in cocktails prepared by the known and proposed methods, as well as recipes of oxygenated cocktails to be prepared through the use of the process as disclosed in the present specification.

In 200 ml of cocktail prepared by the known process there are about 100 ml of oxygen. Thus the oxygen saturation only amounts to 50 percent.

In 200 ml of cocktail prepared through the use of the proposed process there are about 180 ml of oxygen, the oxygen staruation being is high as 90 percent.

Here are some recipes of cocktails to be prepared by using the process of the present disclosure.

General 50 g of dry sweetbrier and 10 to 15 g of immortelle are brewed in 1 to 1.5 l of water, drawn for 5 to 5 hours and filtered. One egg-white and 100 g of a fruit syrup are added per 1 l of the infusion.

No 1 (for hypoacidity)

50 g of sweetbrier, 10 to 15 g of immortelle, 15 to 25 g of bluegrass and 15 to 25 g of St. John's wort are added to 1.5 l of water and boiled for 5 minutes. After having been drawn for 5 to 6 hours, the infusion is filtered. One egg-white and 100 to 150 g of currant, strawberry, cherry or other syrup are added to the infusion.

No 2 (for hyperacidity)

50 g of sweetbrier and 10 to 15 g of each of the following components: sweet flag calamus, root motherwort, cudweed, mint, buckthorn, and St. John's wort — are brewed in 1 to 1.5 l of water. One teaspoonful of honey is recommended before drinking the cocktail.

No 3 (for hypertension)

50 g of sweetbrier, 20 to 30 g of astragalus, 10 to 15 g of motherwort, 10 to 15 g of cudweed, 10 to 20 g of hawthorn and 10 to 15 g of buckthorn are brewed in 1 to 1.5 l of water. Eff-white and syrup are added as in Recipe No. 1.

No 4 (for diabetes)

2 g of vitamin C are dissolved in a concentrated sweetbrier infusion (100 g of sweetbrier per 1 l of water). One egg-white is added per two liters of infusion.

The proposed process for the preparation of oxygenated cocktail makes it possible to prepare oxygenated cocktail with a high degree of foam dispersion and a high oxygen content in small quantities of liquid.

The proposed process makes for continuous oxygenated cocktail production.

The proposed apparatus for effecting the process of this specification ensures directional and uniform introduction of oxygen over the entire volume of foam-forming food liquid being oxygenated, as well as directional supply of said liquid to the place whereto dispersed oxygen is supplied.

The apparatus of this invention ensures discharge of prepared cocktail from the vessel with maximum preservation of its foam structure and helps to meet the sanitary and hygienic requirements imposed upon the mass oxygenated cocktail production.

The apparatus is simple in design and easy to operate and provides for continuous cocktail production.

A minimum oxygen supply pressure of 0.2 kgf/cm$^2$ ensures complete operational safety.

Oxygenated cocktails prepared in accordance with the proposed process are an effective means of enteral oxygen therapy to treat different pathological states characterized by a decreased oxygen content in the human organism. These cocktails are conducive to appetite and sleep, eliminate headaches due to intoxication, and improve the general state of the organism.

The preparation of oxygenated cocktails by using the process disclosed hereinabove makes it possible to provide such cocktails for large numbers of people suffering from oxygen deficiency due to intensified physical and mental work, including sportsmen, metallurgical workers and workers of other unhealthy occupations, miners, highschool and college students, white collar personnel, and aged persons.

The employment of the proposed process and apparatus for the production of oxygenated cocktail provides simple and effective means of combatting oxygen deficiency.

What is claimed is:

1. A process for preparing oxygenated cocktails comprising the steps of continuously supplying a foam-forming beverage as a beverage layer less than 5 mm thick but in sufficient amounts to make an oxygenated cocktail and continuously dispersing oxygen gas which is free of all other gas except at most 1% nitrogen into the beverage layer, such that the beverage layer forms a foam and rises above newly supplied foam-forming beverage, to form an upper layer about the newly supplied foam-forming beverage.

* * * * *